(12) United States Patent
Smith et al.

(10) Patent No.: US 9,975,143 B2
(45) Date of Patent: May 22, 2018

(54) CHEMICAL VAPOR DEPOSITION FUNCTIONALIZATION

(71) Applicant: SILCOTEK CORP., Bellefonte, PA (US)

(72) Inventors: David A. Smith, Bellefonte, PA (US); Paul H. Silvis, Port Matilda, PA (US)

(73) Assignee: Silcotek Corp., Bellefonte, PA (US)

( * ) Notice: Subject to any disclaimer, the term of this patent is extended or adjusted under 35 U.S.C. 154(b) by 195 days.

(21) Appl. No.: 14/784,731

(22) PCT Filed: May 14, 2014

(86) PCT No.: PCT/US2014/038006
§ 371 (c)(1),
(2) Date: Oct. 15, 2015

(87) PCT Pub. No.: WO2014/186470
PCT Pub. Date: Nov. 20, 2014

(65) Prior Publication Data
US 2016/0059260 A1 Mar. 3, 2016

Related U.S. Application Data

(60) Provisional application No. 61/823,137, filed on May 14, 2013.

(51) Int. Cl.
*B05D 1/00* (2006.01)
*B05D 5/08* (2006.01)
*C09D 5/08* (2006.01)

(52) U.S. Cl.
CPC .............. *B05D 1/60* (2013.01); *B05D 5/083* (2013.01); *C09D 5/08* (2013.01)

(58) Field of Classification Search
CPC ............. B05D 1/60; B05D 5/083; C09D 5/08
See application file for complete search history.

(56) References Cited

U.S. PATENT DOCUMENTS

| | | |
|---|---|---|
| 4,173,661 A | 11/1979 | Bourdon |
| 4,579,752 A | 4/1986 | Dubois et al. |
| 4,671,997 A | 6/1987 | Galasso et al. |
| 4,714,632 A | 12/1987 | Cabrera et al. |
| 4,741,964 A | 5/1988 | Haller |
| 4,749,631 A | 6/1988 | Haluska et al. |
| 4,753,856 A | 6/1988 | Haluska et al. |
| 4,792,460 A | 12/1988 | Chu et al. |
| 4,842,888 A | 6/1989 | Haluska et al. |
| 5,160,544 A | 11/1992 | Garg et al. |
| 5,250,451 A | 10/1993 | Chouan |
| 5,299,731 A | 4/1994 | Liyanage et al. |
| 5,480,677 A | 1/1996 | Li et al. |
| 5,481,135 A | 1/1996 | Chandra et al. |
| 5,562,952 A | 10/1996 | Nakahigashi et al. |
| 5,563,102 A | 10/1996 | Michael |
| 5,818,071 A | 10/1998 | Loboda et al. |
| 5,825,078 A | 10/1998 | Michael |
| 6,159,871 A | 12/2000 | Loboda et al. |
| 6,280,834 B1 | 8/2001 | Veerasamy et al. |
| 6,312,808 B1 * | 11/2001 | Veerasamy ............ B05D 5/083 428/217 |
| 6,416,816 B2 | 7/2002 | Veerasamy et al. |
| 6,444,326 B1 | 9/2002 | Smith |
| 6,472,076 B1 | 10/2002 | Hacker |
| 6,511,760 B1 | 1/2003 | Barone et al. |
| 6,531,182 B2 | 3/2003 | Veerasamy et al. |
| 6,531,398 B1 | 3/2003 | Gaillard et al. |
| 6,593,655 B1 | 7/2003 | Loboda et al. |
| 7,070,833 B2 | 7/2006 | Smith et al. |
| 7,867,627 B2 | 1/2011 | Smith et al. |
| 8,286,571 B2 | 10/2012 | Driver et al. |
| 2004/0037956 A1 | 2/2004 | Yang |
| 2004/0175579 A1 | 9/2004 | Smith et al. |
| 2006/0216952 A1 | 9/2006 | Bhanap et al. |
| 2012/0251797 A1 | 10/2012 | Smith et al. |
| 2013/0244025 A1 | 9/2013 | Smith et al. |
| 2014/0370300 A1 | 12/2014 | Smith |
| 2015/0030885 A1 | 1/2015 | Smith |
| 2015/0283307 A1 | 10/2015 | Smith et al. |

OTHER PUBLICATIONS

Restek Performance Coatings Service Through Technology, www.restekcorp.com, 2003, 1 pg.
D.A. Smith, D. Shelow and G. Barone, "Instrument and Sampling Equipment Passivation Requirements to Meet Current Demands for Low-Level Sulfur Analysis," 2001, 37 pgs.
Fast Facts At-a-Glance Product Information from Restek, Silcosteel-UHV, Dramatically Reduce Outgassing in UHV Systems, www.restekcorp.com, 2001, 2 pgs.
Fast Facts At-a-Glance Product Information from Restek, Silcosteel-CR, Achieve Specialty Alloy Performance Using Austenitic Stainless Steels, www.restekcorp.com, 2004, 4 pgs.
D.A. Smith, G.B. Stidsen, B. Burger and D. Shelow, "The Containment and Transfer of Trace Sulfur Gases at Low-PPBV Levels," 2001, 37 pgs.
G.A. Barone, D.A. Smith and M. Higgins, "Anti-Corrosive and Anti-Coking Properties of Unique Surface Coatings for Metal Substrates in Petrochemical Service," www.restekcorp.com, obtained Feb. 2015, 19 pgs.
G.A. Barone, D.A. Smith and D. Shelow, "Advantages to Using Inert, Coated Components for Sampling & Measurement of Organo-Sulfur Compounds," www.restekcorp.com, obtained Feb. 2015, 17 pgs.
R.L. Firor and B.D. Quimby, "Dual-Channel Gas Chromatographic System for the Determination of Low-Level Sulfur in Hydrocarbon Gases," Agilent Technologies, Inc., Mar. 2003, 10 pgs.

(Continued)

*Primary Examiner* — Robert Harlan
(74) *Attorney, Agent, or Firm* — McNees Wallace & Nurick LLC

(57) ABSTRACT

Chemical vapor deposition articles and processes include a chemical vapor deposition functionalization on a material, the material including an sp3 arrangement of carbon. The chemical vapor deposition functionalization is positioned to be contacted by a process fluid, a hydrocarbon, an analyte, exhaust, or a combination thereof. Additionally or alternatively, the chemical vapor deposition functionalization is not of a refrigerator shelf or a windshield.

19 Claims, 7 Drawing Sheets

(56) References Cited

OTHER PUBLICATIONS

R.L. Firor, "Use of GC/MSD for Determination of Volatile Sulfur: Application in Natural Gas Fuel Cell Systems and Other Gaseous Streams," Agilent Technologies, Inc., Nov. 2001, 10 pgs.

V. Pretorius and J.D. Du Toit, "Gas Chromatography in Glass and Fused Silica Capillary Columns: Deactivation of the Inner Surface Using Silicon Films," Journal of HRC & CC, 1981, 2 pgs.

D.A. Smith, M. Higgins and G. Barone, "Evaluation of System Surfaces in Low-Level Sulfur Analysis for the Petrochemical Industry," www.restekcorp.com, obtained Feb. 2015, 37 pgs.

G. Barone, D.Smith and M. Higgins, "Selection of Surface Coatings for Process Lines and Equipment Used in Corrosive and Reactive Streams", Analytical Solutions for Energy Optimization & Environmental Compliance, The 54th Annual Symposium of the Analysis Division, Apr. 2009, 17 pgs.

J. De Zeeuw, G. Barone and M. Higgins, "Comparing Surface Adsorption Effects During the Analysis of Mercury and Sulfur Containing Streams," www.restekcoatings.com, obtained Feb. 2015, 30 pgs.

G. Barone, D. Smith, M. Higgins and T. Neeme, "Study of Chemical and Physical Adsorption Properties of Moisture, Sulfur, and Mercury Streams Through a Variety of Tubing Substrates," ISA 53rd Analysis Division Symposium, 2008, 9 pgs.

D.A. Smith and J.B. Mattzela, The Deposition and Functionalization of Silicon-Based Materials to Prevent Surface Corrosion, Adsorption, Contamination and Catalytic Interactions, MS&T'09, Oct. 2009, 21 pgs.

W. Bertsch and V. Pretorius, "Deactivation of Metal Surfaces for Capillary Columns for GC by Deposition of Silicon," Journal of HRC&CC, 1982, 3 pgs.

G.G. Gerhab and A. Schuyler, "Highly Inert Sample Pathways," 1996, 16 pgs.

A. Schuyler, J.W. Stauffer, C.E. Loope and C.R. Vargo, "Highly Efficient and Inert Stainless Steel GC Columns: A Durable, Flexible Alternative to Fused Silica," Elsevier Science Publishers, 1992, 6 pgs.

G. Gerhab and A. Schuyler, "Efficient and Rapid GC Analysis With Rugged Metal Microbore Capillary Columns," www.restekcorp.com, obtained Feb. 2015, 18 pgs.

J. De Zeeuw, "Deactivation of Metal Surfaces: Applications in Gas Chromatography (GC) for the Past 15 Years," American Laboratory, Nov. 2012, 10 pgs.

J. Choi et al., "Self-Assembled Monolayers as Lubricants for Magnetic Disk Drives," IEEE Transactions on Magnetics, vol. 41, No. 2, Feb. 2005, pp. 599-603.

J. Choi, et al., "Self-Assembled Monolayer on Diamond-like Carbon Surface: Formation and Friction Measurements," Tribology International 36, 2003. pp. 285-290.

\* cited by examiner

FIG. 7
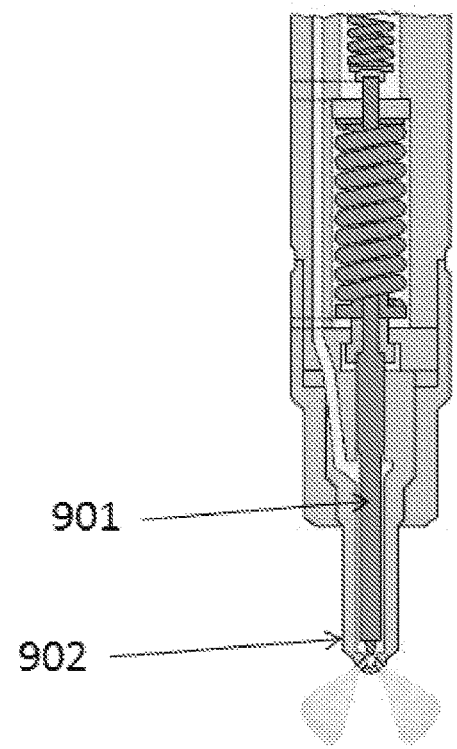
901
902
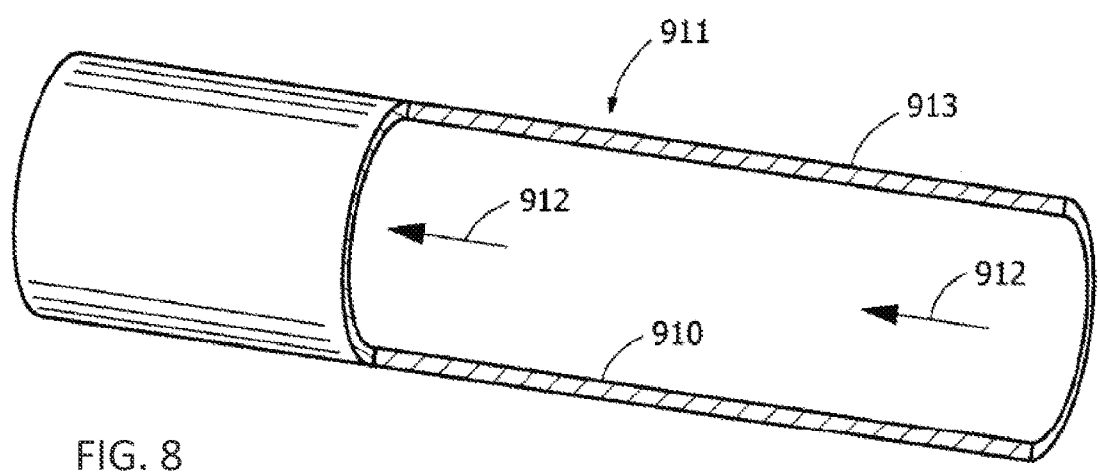
911
913
912
912
910
FIG. 8

CHEMICAL VAPOR DEPOSITION FUNCTIONALIZATION

PRIORITY

The present disclosure claims priority and benefit of U.S. Provisional Patent Application No. 61/823,137, titled "COATED ARTICLE AND CHEMICAL VAPOR DEPOSITION PROCESS" and filed May 14, 2013, the entirety of which is incorporated by reference.

FIELD

The present disclosure is directed to chemical vapor deposition functionalization. More particularly, the disclosure is directed to chemical vapor deposition functionalization of or on an $sp^3$ arrangement of carbon, the coating positioned to be contacted, for example, by a process fluid, a hydrocarbon, an analyte, exhaust, or a combination thereof.

BACKGROUND

Often, surfaces of substrates do not include desired performance characteristics. The failure to include specific desired performance characteristics can result in surface degradation in certain environments, an inability to meet certain performance requirements, or combinations thereof. For example, in certain environments, surfaces can be subjected to wear and other undesirable surface activities such as chemical adsorption, catalytic activity, corrosive attack, oxidation, by-product accumulation or stiction, and/or other undesirable surface activities.

Undesirable surface activities can cause chemisorption of other molecules, reversible and irreversible physisorption of other molecules, catalytic reactivity with other molecules, attack from foreign species, a molecular breakdown of the surface, physical loss of substrate, or combinations thereof.

To provide certain desired performance characteristics, a surface can include diamond-like carbon (DLC) with an arrangement of $sp^3$ hybridized carbon atoms. However, such surfaces may have undesirable surface characteristics for certain applications.

Attempts to use such coatings on materials having an $sp^3$ arrangement of carbon positioned to be contacted, for example, by a process fluid, a hydrocarbon, an analyte, exhaust, or a combination thereof, are unknown. Materials positioned in other places, such as, refrigerator shelves and automobile windshields, are not positioned in contact with such substances and, thus, generally focus on other issues.

Accordingly, functionalization of or on $sp^3$ arrangements of carbon that shows one or more improvements in comparison to the prior art would be desirable in the art.

BRIEF DESCRIPTION OF THE INVENTION

In an embodiment, a chemical vapor deposition functionalized article includes a chemical vapor deposition functionalization on a material, the material including an $sp^3$ arrangement of carbon. The chemical vapor deposition functionalization is positioned to be contacted by a process fluid, a hydrocarbon, an analyte, exhaust, or a combination thereof.

In another embodiment, a chemical vapor deposition functionalized article includes a chemical vapor deposition functionalization on a material, the material including an $sp^3$ arrangement of carbon. The chemical vapor deposition functionalized article is not a refrigerator shelf or a windshield. The material is a substrate selected from the group consisting of a metal substrate, a metallic substrate, a stainless steel substrate, a ceramic matrix composite substrate, a ceramic substrate, a composite metal substrate, a fiber substrate, a foil substrate, and combinations thereof. The chemical vapor deposition functionalized article has a structure selected from the group consisting of a tube, a pipe, a fixture, a needle, a wafer, a column, a container, a fitting, a piston, a ring, a cylinder, a bearing, a ball, a roller bearing, a tool, a stent, or a combination thereof.

In another embodiment, a chemical vapor deposition process includes chemical vapor deposition functionalizing on a material, the material including an $sp^3$ arrangement of carbon. The chemical vapor deposition functionalizing is on a surface positioned to be contacted by a process fluid, a hydrocarbon, an analyte, exhaust, or a combination thereof.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 7 shows an article having a chemical vapor deposition functionalization, according to an embodiment of the disclosure.

FIG. 8 shows an article having a chemical vapor deposition functionalization, according to an embodiment of the disclosure.

Wherever possible, the same reference numbers will be used throughout the drawings to represent the same parts.

DETAILED DESCRIPTION OF EXEMPLARY EMBODIMENTS

Provided is chemical vapor deposition (CVD) functionalization of an $sp^3$ arrangement of carbon. Embodiments of the present disclosure, for example, in comparison to similar concepts failing to include one or more of the features disclosed herein, permit additional properties relating to hardness, inertness, chemical corrosive resistance, tailorability, hydrophobicity, oleophobicity, pH resistance, anti-corrosiveness, anti-stiction, anti-coking, wear resistance, lower friction, or combinations thereof, for example, with or without pre-treating of materials.

Figure 1:
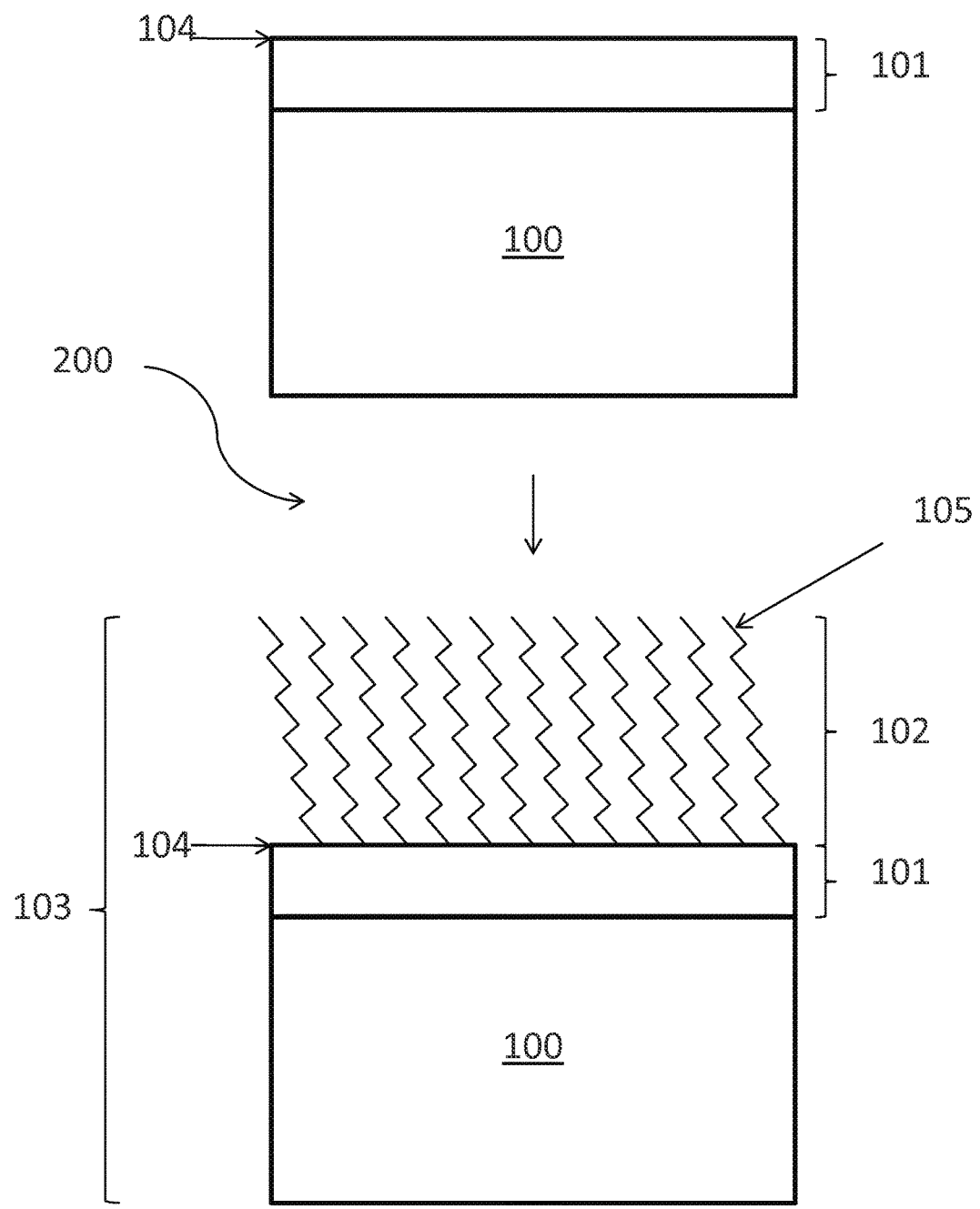
FIG. 1 shows a schematic view of an article receiving a chemical vapor deposition functionalization, according to an embodiment of the disclosure.

Referring to FIG. 1, a CVD functionalized article 103 includes a material having an $sp^3$ arrangement of carbon, for example, in or on a substrate 100, a layer 101, a surface 104, one or more intermediate layers (not shown), other suitable portions and/or layers, or a combination thereof. The $sp^3$ arrangement, in comparison to materials exclusively having $sp^2$ bonded carbons, includes increased hardness, a decreased coefficient of friction, increased wear resistance, extended operational life for specific applications, a lighter weight, increased compressive stress, increased dielectric properties, other suitable benefits, or a combination thereof. The $sp^3$ arrangement correlates with any carbon-containing material having at least one $sp^3$ bonded carbon atom, for example, as in tetrahedral amorphous carbon (ta-C). In other embodiments, some of the carbon is $sp^3$ bonded and some of the carbon is $sp^2$ bonded, for example, based upon carbon being arranged in a cubic lattice and a hexagonal lattice (such as in lonsdaleite). In one embodiment, the $sp^3$ arrangement includes one or more fillers. Suitable fillers include, but are not limited to, hydrogen, graphitic $sp^2$ carbon, metal(s) (such as 304 stainless steel, titanium-containing alloys, iron-containing alloys), or a combination thereof.

Figure 2:
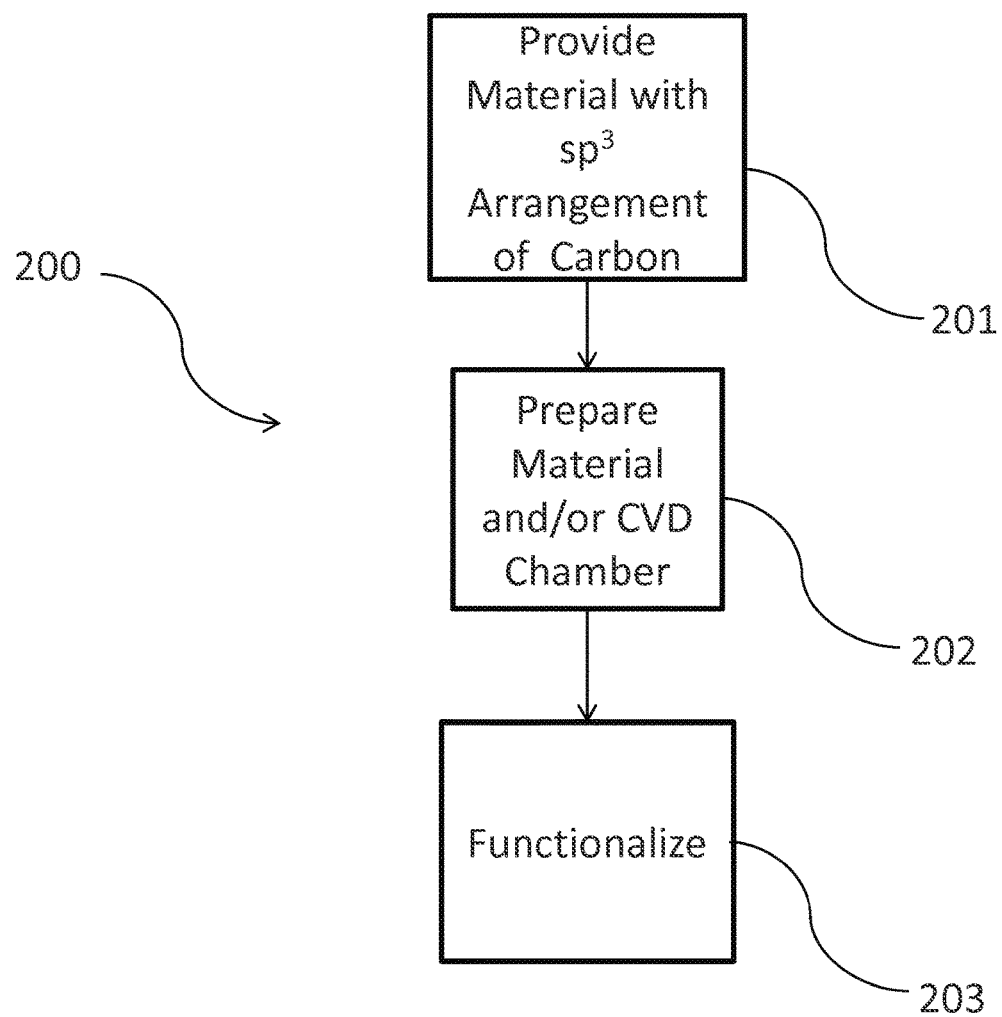
FIG. 2 shows a schematic view of a chemical vapor deposition functionalization, according to an embodiment of the disclosure.

The material is CVD functionalized to produce a CVD functionalization 102 through a CVD functionalization process 200, shown in FIG. 2. The CVD functionalization process 200 modifies surface properties, for example, through the bonding of a functional molecule 105, as shown in FIG. 1. The $sp^3$ arrangement is present before, during, and/or after the CVD functionalization process 200 and, although the term "on" is used, it is intended to also encompass the CVD functionalization 102 being in or to the materials having an $sp^3$ arrangement of carbon, which would result in the functionalization 102 being on a portion of the material having the $sp^3$ arrangement of carbon. In one embodiment, the $sp^3$ arrangement (and any present $sp^2$ carbon) is fixed in position by the functionalization 102. According to one embodiment of the CVD functionalization process 200, the fixing of the $sp^3$ arrangement is capable of being achieved at a slower rate and/or more gradual temperature change than processes used for high energy precursive carbons present in plasmas, filtered cathodic arc deposition, sputter deposition, and/or ion beam deposition. In a further embodiment, the proportion of amorphous and crystalline carbon is capable of being adjusted in comparison to a given amount of energy used by other processes.

The substrate 100 is any suitable substrate, such as, a metal substrate, a metallic substrate (ferrous or non-ferrous), stainless steel, ceramic matrix composite substrate, a ceramic substrate, a composite metal substrate, a coated substrate, a fiber substrate, a foil substrate, a film, or a combination thereof.

Referring to FIG. 2, in one embodiment, the CVD functionalized article 103 is produced by the CVD functionalization process 200 that includes, consists of, or consists essentially of positioning the material (step 201), preparing the material and/or a CVD chamber (step 202), and then CVD functionalizing (step 203) in one, two, or three steps, with intermediate steps, such as, purges and temperature conditioning, each lasting a selected period, such as, greater than 1 hour, greater than 2 hours, greater than 3 hours, greater than 4 hours, greater than 5 hours, greater than 6 hours, or any suitable combination, sub-combination, range, of sub-range therein. The CVD functionalized article 103 is any suitable component capable of benefiting from the properties disclosed herein. In one embodiment, the CVD functionalized article 103 is positioned to be contacted by a process fluid, a hydrocarbon, exhaust, an analyte, other suitable substances, or a combination thereof. As used herein, the term "process fluid" refers to a liquid or gas within a manufacturing process, a refining process, a power/energy production process, or another similar process, for example, oil, lubricant, chemicals, or a combination thereof. As used herein, the term "exhaust" refers to a liquid or gas expelled from the manufacturing process, the refining process, the power/energy production process, or another similar process. As used herein, the term "analyte" refers to a liquid or gas sample, for example, a biological sample, an organic sample (such as, a laboratory sample), a test standard, a calibration sample, other suitable samples, or combinations thereof. Suitable embodiments of the CVD functionalized article 103 include, but are not limited to, a tube, a pipe, a fixture, a needle, a wafer, a column, a container, a fitting, a piston, a ring, a cylinder, a bearing, a ball, a roller bearing, a toot, and/or a stent.

The chamber used for the CVD functionalization process 200 is a CVD chamber, for example, with tubing connections to allow gas and/or liquid flow in and out of the CVD chamber. In one embodiment, the CVD chamber includes multiple controlled inlets and outlets configured for providing and removing multiple gas and/or liquid streams and/or a vacuum connected to one or more outlet tubes. The positioning (step 201) is or includes placing the material into the CVD chamber, for example, on a fixture or other suitable arrangement. The preparing (step 202) is or includes any suitable techniques taken to prepare the CVD chamber and/or the material while in the CVD chamber. Suitable techniques for the preparing (step 202) include, but are not limited to, cleaning, pre-heating, isolating the material, surface treatment techniques, evacuating the CVD chamber (for example, with the flow of gas and/or maintenance of a vacuum in the CVD chamber providing a controlled atmosphere), flushing/purging the CVD chamber (for example, with an inert gas, consisting of or consisting essentially of nitrogen, helium, and/or argon), or a combination thereof.

In one embodiment, a heat source controls the temperature in the CVD chamber, for example, to desorb water and remove contaminants. In one embodiment, the heating is at a temperature range above about 100° C., above 200° C., above 250° C., between 250° C. and 400° C., between 250° C. and 350° C. (for example, about 300° C.) and/or at a pressure range (for example, between about 1 atmosphere and about 3 atmospheres, between about 1 atmosphere and about 2 atmospheres, between about 2 atmospheres and about 3 atmospheres, about 1 atmosphere, about 2 atmospheres, about 3 atmospheres, or any suitable combination, sub-combination, range, or sub-range therein). In one embodiment, the heating is for a period (for example, between about 3 minutes and about 15 hours, between about 0.5 hours and about 15 hours, between about 2 hours and about 8 hours, between about 2 hours and about 5 hours, between about 5 hours and about 7 hours, for about 3 minutes, for about 0.5 hours, for about 2 hours, for about 15 hours, or any suitable combination, sub-combination, range, or sub-range therein). The conditions of the CVD chamber are within such ranges throughout the CVD functionalization process 200 or are cycled, for example, with purge steps and/or steps encompassed by the CVD functionalizing (step 203).

Figure 3:
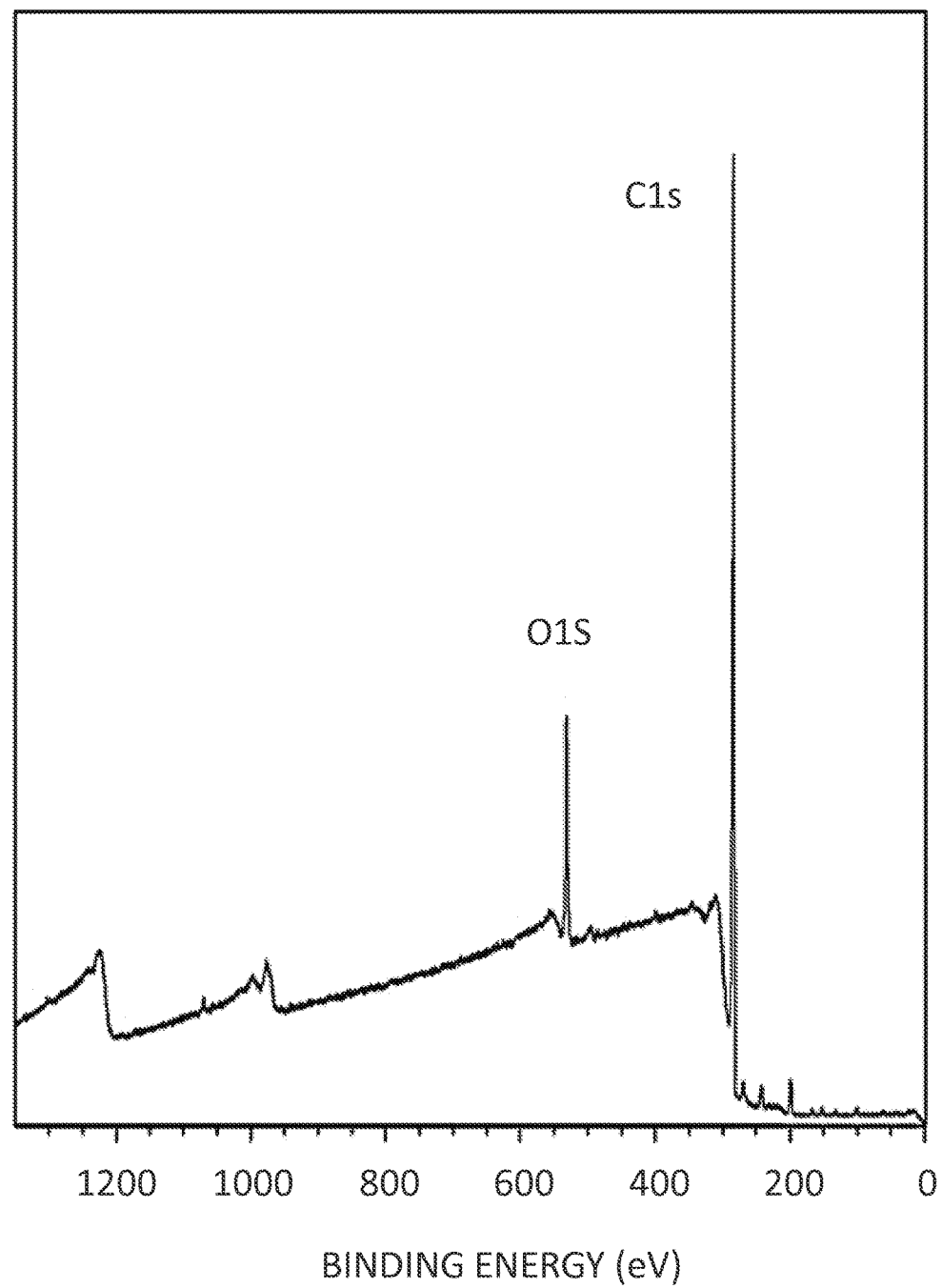
FIG. 3 shows an X-ray Photoelectron Spectroscopy plot of a material for chemical vapor deposition functionalization, according to an embodiment of the disclosure.
Figure 4:
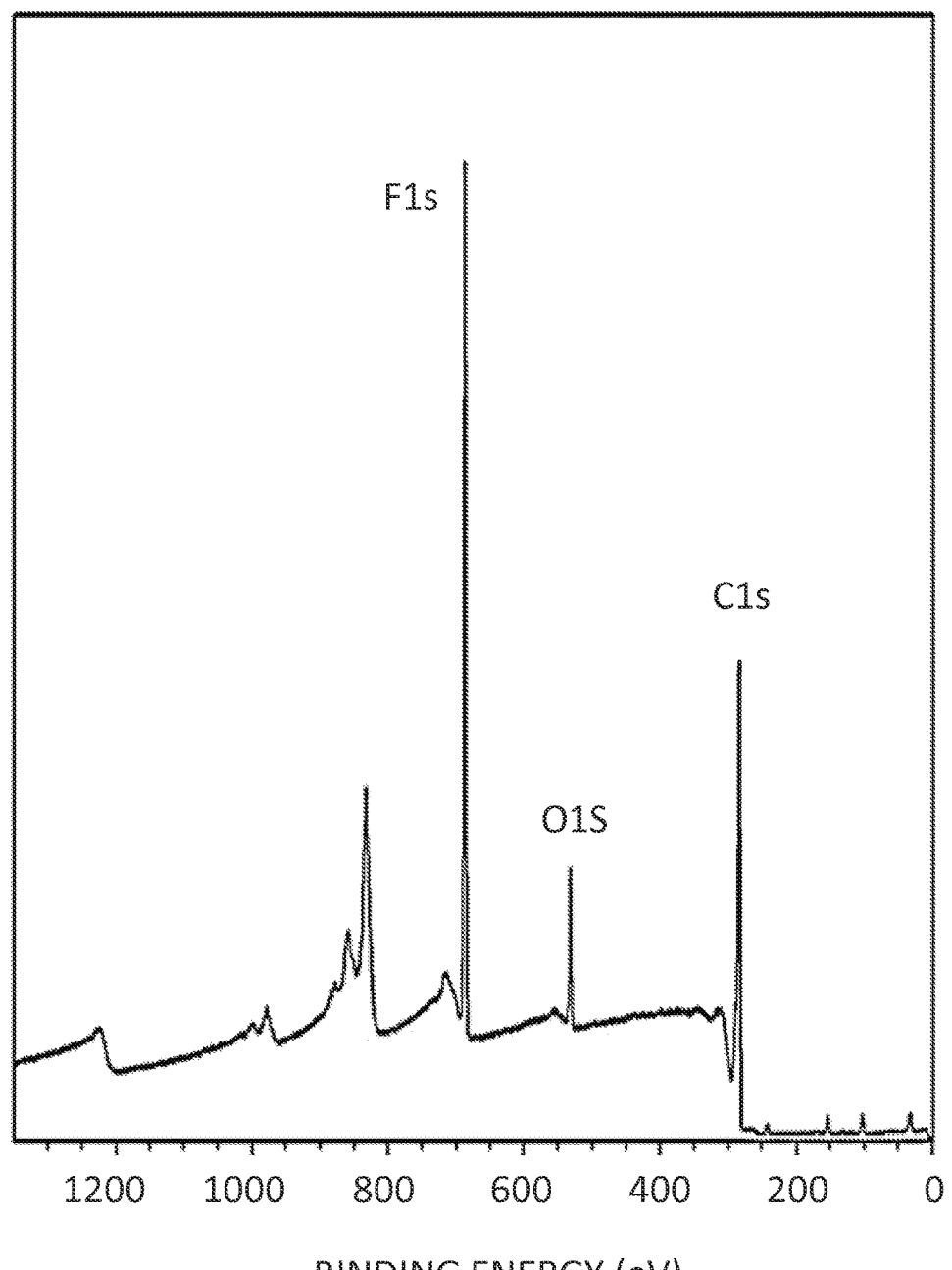
FIG. 4 shows an X-ray Photoelectron Spectroscopy plot of a material having a chemical vapor deposition functionalization, according to an embodiment of the disclosure.

FIGS. 3-4 illustrate the effect of the CVD functionalization process 200, according to one embodiment. FIG. 3 shows the material prior to the CVD functionalizing (step 203) and FIG. 4 shows the material after the CVD functionalizing (step 203). For example, by X-ray Photoelectron Spectroscopy, FIG. 3, shows the presence of carbon atoms with a C1s peak at a binding energy centered around 284 eV, including sp² and sp³ hybridized carbon atoms. FIG. 3 also shows a presence of an O1s peak, indicating a native presence of oxygen. FIG. 4, by X-ray Photoelectron Spectroscopy, shows that the material has been functionalized by the CVD functionalizing (step 203), for example, from an organofluorosiloxy functionalization reagent. FIG. 4 shows the presence of carbon atoms with a C1s peak at a binding energy centered around 284 eV, including sp² and sp³ hybridized carbon atoms. There is also a presence of an O1s peak indicating a naive presence of oxygen, a significant F1s peak at a binding energy of around 689 eV, and an additional C—F hump at around 291 eV within the C1s structure. The additional peaks indicate the presence of the functionalized organofluorosiloxy moiety.

Figure 5:
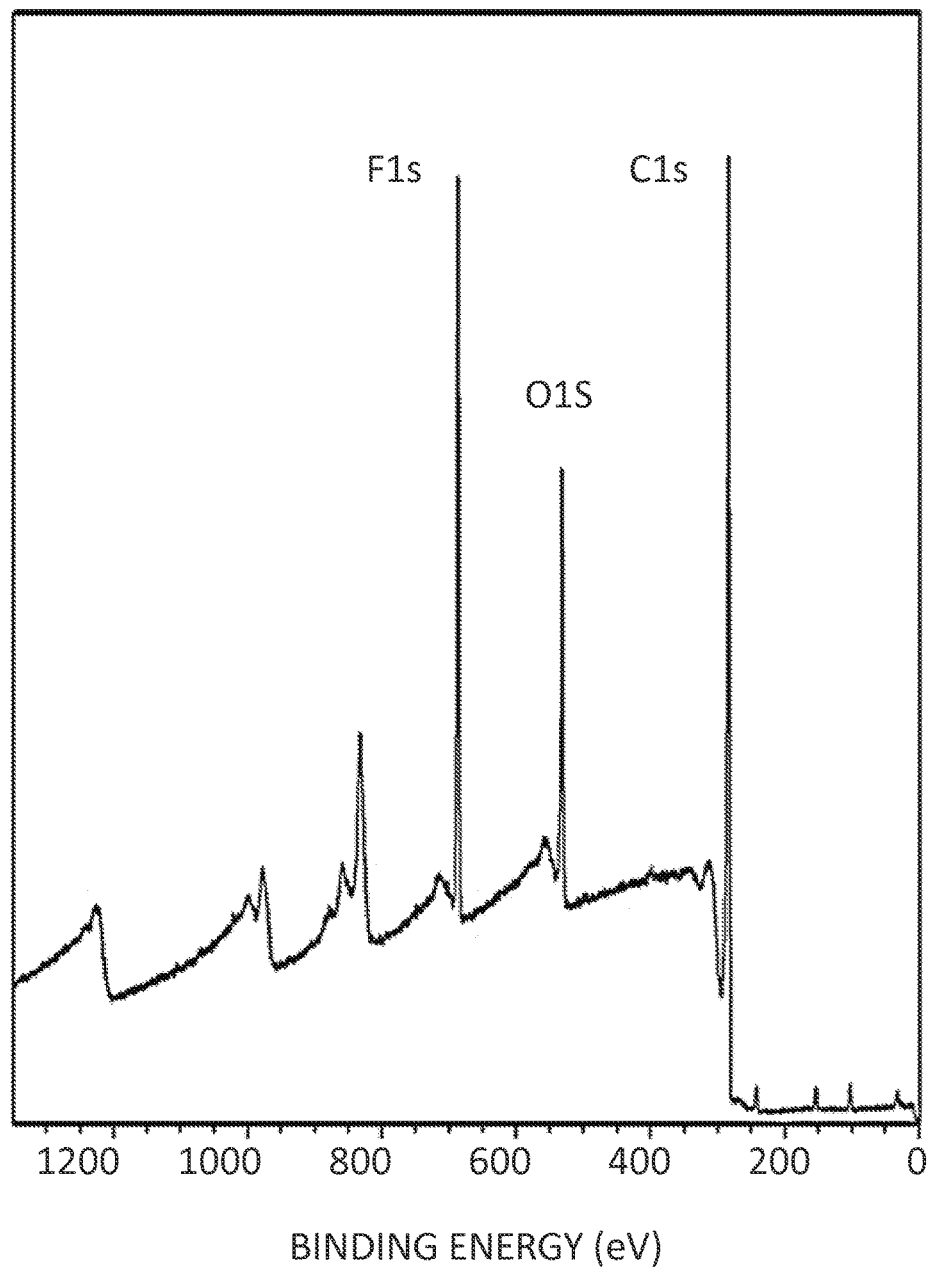
FIG. 5 shows an X-ray Photoelectron Spectroscopy plot corresponding to exposure testing of an article having a chemical vapor deposition functionalization, according to an embodiment of the disclosure.

FIG. 5 further illustrates the effect of the CVD functionalization process 200, according to one embodiment, with regard to exposure properties. FIG. 5 shows the material after exposure of the material to air at about 300° C. for about 6 hours. FIG. 5, by X-ray Photoelectron Spectroscopy, shows that the material has been functionalized by the CVD functionalizing (step 203), for example, from an organofluorosiloxy functionalization reagent, through the presence of carbon atoms with a C1s peak at a binding energy centered around 284 eV, including sp² and sp³ hybridized carbon atoms, a presence of an O1s peak indicating a presence of native oxygen, a significant F1s peak at a binding energy of around 689 eV, and an additional C—F hump at around 291 eV within the C1s structure. High resolution analysis of FIG. 5 shows no growth of a carbon-oxygen peak at a binding energy centered around 288.4 eV, despite the exposure conditions.

In the CVD functionalizing (step 203), a reagent is introduced into the CVD chamber. The reagent reacts with and/or binds to the layer 101 or portions of the layer 101 to form the functionalization 102, for example, an organofluorosiloxy surface formed by reaction with an organofluoroalcoxysilane. In one embodiment, residual moieties from the layer 101 are reacted with $(R)_x Si[CH_2 CH_2 (CF_2)_n FC_3]_y$, where the sum of x and y is four, R is a functional group, such as, alkoxy, hydrogen, or hydroxyl, and/or n is zero or sixteen. In one embodiment, the functional group is modified to adjust the properties of the functionalization 102, for example, to increase the hydrophobicity of the functionalization 102 by using a fluorinated hydrocarbon as the R-group. In one embodiment, the fluorinated hydrocarbon forms a hydrophobic surface, an oleophobic surface, or a combination thereof.

Figure 6:
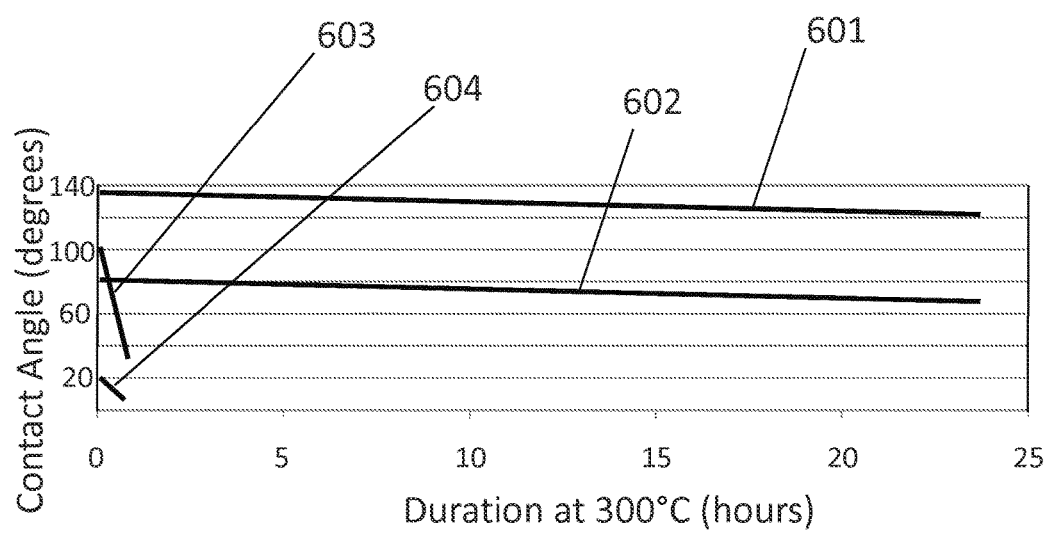
FIG. 6 shows hydrophobicity and oleophobicity performance of a chemical vapor deposition functionalized article having a chemical vapor deposition functionalization, according to an embodiment of the disclosure.

The functionalization 102 includes properties corresponding to the reagent used and operational parameters. In one embodiment, in comparison to the layer 101, the functionalization 102 has an increased water contact angle, for example, from about 100° to about 130° (for example, greater than 110° or greater than 120°) and/or has an increased hexadecane contact angle, for example, from about 20° to about 82° (for example, greater than 70° or greater than 80°) (see FIG. 6). Referring to FIG. 6, exposing the layer 101 and the functionalization 102 to 300° C. of air in a laboratory setting corresponds with the water contact angle 601 of the functionalization 102 decreasing from about 130° to about 123° and the hexadecane contact angle 602 decreasing from about 82° to about 65° over 23.5 hours, in comparison to the water contact angle 603 for the layer 101 decreasing from about 100° to about 35° within 1 hour of exposure and the hexadecane contact angle 604 decreasing from about 200 to about 10° within 1 hour of exposure.

In an embodiment with the functionalization 102 being produced from organofluorosilane, the average friction coefficient measurements on a linear reciprocation tribometer with a 0.5N force are 0.18 for the layer 101, 0.21 for the functionalization 102, and greater than 0.21 (for example, 0.23) for the functionalization 102 after the exposure to air at 300° C. for 6 hours.

In one embodiment, the functionalization 102 is formed by applying the organofluoro treatment, where the organofluoro treatment is $(R)_{1-3}Si(X)_{1-3}$, where R equals an organofluoro group and X equals —H, —OH, —OR' (R' being an alkyl group, such as a methyl group, ethyl group, propyl group, or butyl group). Additionally or alternatively, R and/or R' correspond with any suitable group, including, but not limited to, an alkyl, aryl, halogenated alkyl and aryl, ketone, aldehyde, acyl, alcohol, epoxy, and nitro-organo, organometallic functionality, or combination thereof. Additionally or alternatively, in one embodiment, the functionalization 102 is formed by the organofluoro treatment including an organofluoro silyl (for example, tridecafluoro 1,1,2,2-tetrahydrooctyltriethoxysilane), any suitable organofluoro alcohol (for example, pentafluoropropanol), any suitable fluorosilane, or a combination thereof. In one embodiment, the fluorosilane has the following general formula:

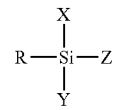

In this embodiment, X represents H, hydroxyl group, or alkoxy group (including, for example, methoxy, ethoxy, or butyoxy), Y represents X or R constituents, Z represents X or R constituents, and R represents an organofluoro functional group having the structure $CF_3(CF_2)_n(CH_2)_2$.

In one embodiment, the functionalization 102 has increased oleophobicity and/or hydrophobicity. In one embodiment, the functionalization 102 has a contact angle for deionized water on a mirror diamond-like-carbon surface of greater than about 100°, greater than about 110°, greater than about 120°, greater than about 130°, between about 115° and about 130°, or any suitable range, sub-range, combination, or sub-combination thereof. Additionally or alternatively, in one embodiment, the functionalization 102 has a contact angle for deionized water on a mirror diamond-like carbon surface that is greater than polytetrafluoroethylene, for example, by at least about 10°, at least about 20°, at least about 30°, between about 10° and about 30°, or any suitable range, sub-range, combination, or sub-combination thereof.

In one embodiment, the functionalization 102 has a contact angle for hexadecane of greater than about 60°, greater than about 70°, greater than about 80°, between about 70° and about 80°, or any suitable range, sub-range, combination, or sub-combination thereof. Additionally or alternatively, in one embodiment, the functionalization 102 has a contact angle for hexadecane that is greater than polytetrafluoroethylene, for example, by at least about 15°, at least about 25°, at least about 35°, between about 20° and about 35°, or any suitable range, sub-range, combination, or sub-combination thereof.

In one embodiment, the functionalization 102 includes anti-stiction properties, for example, on any suitable surface, for example, one or more of the surfaces illustrated in FIGS. 7 and 8. FIG. 7 illustrates an application in which a first surface 901 and a second surface 902 are in contact and are moved relative to each other in a reciprocating motion, for example, one of the first surface 901 or the second surface 902 being on an injection needle of the first surface 901 or the second surface 902 being on an injector nozzle, or any other suitable moving parts. FIG. 8 illustrates an application in which a fluid surface 910 is contacted by a moving fluid. In one embodiment, the fluid surface 910 is the interior of a pipe 911, which is rigid or flexible, through which a fluid, such as gas and/or liquid flow(s), as indicated by arrows 912, or any other part in contact with the fluid and in fluid motion. FIG. 8 also illustrates an outer surface 913. Other suitable components and systems having suitable surfaces include, but are not limited to, turbine blades, cylinder heads, crankshafts, camshafts, manifolds, valves, flues, chimneys, evaporators, condensers, coils, combustion chambers, stationary parts, fuel combustion chambers, heat exchange systems and components, exhaust systems, fuel systems, fuel injector systems and components, or combinations thereof. Accordingly, in embodiments of the disclosure, surfaces have a low surface energy capable of preventing accumulation of undesirable materials, such as, carbonaceous material, soot, coke, thermally-degraded hydrocarbons, proteins, biological molecules, biological fluids, or combinations thereof.

In one embodiment, the functionalization 102 includes resistance to erosion (for example, from both solids and liquids) and corrosion. Resistance to erosion occurs in spite of an impinging particle or stream contacting the surface. Resistance to corrosion occurs by preventing surfaces from reacting with the environment and/or reaction products being formed as surface asperities. Such resistance prevents attrition of the reaction products from occurring as a result of crack formation and/or abrasion in the contact interactions of the materials.

The following Examples show various elements relating to the disclosure. Properties and parameters disclosed within the Examples should be considered as being disclosed within the Detailed Description of the Invention, whether comparative in nature or illustrative in nature.

EXAMPLE 1

In a first example, a fuel injection needle having a diamond-like-carbon material is functionalized by adding (heptadecafluoro-1,1,2,2-tetrahydrodecycl) trimethoxysilane to a CVD chamber at 22° C. Residual air is removed from the CVD chamber via alternating vacuum and nitrogen backfill cycles. A partial pressure of nitrogen is added to the CVD chamber at 25 psia (just below 2 atmospheres), the temperature within the CVD chamber is increased to 375° C., the conditions are maintained for 7.5 hours, and then unreacted material is removed through alternating vacuum and nitrogen backfill cycles. The CVD chamber is next filled with 25 psia (just below 2 atmospheres) nitrogen and maintained at 375° C. for 3 hours before reducing the temperature to ambient temperature.

The resultant water contact angle of the functionalization is 127.5° and the hexadecane contact angle is 77.7°. Thermal oxidative stability of the surface at 300° C. in air after 3-hour exposure is very high, as illustrated by water contact angle being 125.2° and hexadecane contact angle being 68.8°. The functionalization is easily capable of being scratched with a metal pick.

EXAMPLE 2

In a second example, a fuel injection needle having a diamond-like-carbon material is functionalized by adding (heptadecafluoro-1,1,2,2-tetrahydrodecycl) trimethoxysilane to a CVD chamber at 22° C. Residual air is removed from the CVD chamber via alternating vacuum and nitrogen backfill cycles. A partial pressure of nitrogen is added to the CVD chamber at 25 psia (just below 2 atmospheres), the temperature within the CVD chamber is increased to 300° C., the conditions are maintained for 7.5 hours, and then unreacted material is removed through alternating vacuum and nitrogen backfill cycles. The CVD chamber is next filled with 25 psia (just below 2 atmospheres) nitrogen and maintained at 300° C. for 3 hours before reducing the temperature to ambient temperature.

The resultant water contact angle of the functionalization is 125.4° and the hexadecane contact angle is 84.4°. Thermal oxidative stability of the surface at 300° C. in air after 4.5-hour exposure is very high, as illustrated by water contact angle being 121.6° and hexadecane contact angle being 70.20. The functionalization is not easily capable of being scratched with a metal pick, especially in comparison to Example 1.

EXAMPLE 3

In a third example, which relies upon twice as much of the (heptadecafluoro-1,1,2,2-tetrahydrodecycl) trimethoxysilane as Example 1 or 2, a fuel injection needle having a diamond-like-carbon material is functionalized by adding (heptadecafluoro-1,1,2,2-tetrahydrodecycl) trimethoxysilane to a CVD chamber at 300° C. A partial pressure of nitrogen is added to the CVD chamber at 25 psia (just below 2 atmospheres), the temperature within the CVD chamber is increased to 300° C. the conditions are maintained for 7 hours, and then unreacted material is removed through alternating vacuum and nitrogen backfill cycles. A second treatment of the (heptadecafluoro-1,1,2,2-tetrahydrodecycl) trimethoxysilane is added to the CVD chamber at 300° C., a partial pressure of nitrogen is added to the CVD chamber at 25 psia (just below 2 atmospheres), the conditions are maintained for 7 hours, and then unreacted material is removed through alternating vacuum and nitrogen backfill cycles. The CVD chamber is next filled with 25 psia (just below 2 atmospheres) nitrogen and maintained at 300° C. for 5 hours before reducing the temperature to ambient temperature.

The resultant water contact angle of the functionalization is 120.4° and the hexadecane contact angle is 82.7°. Thermal oxidative stability of the surface at 300° C. in air after 4.5-hour exposure is very high, as illustrated by water contact angle being 124.10 and hexadecane contact angle being 76.2°.

EXAMPLE 4

In a fourth example, which relies upon lessened functionalization bonding time, a fuel injection needle having a diamond-like-carbon material is functionalized by adding (heptadecafluoro-1,1,2,2-tetrahydrodecycl) trimethoxysilane to a CVD chamber at 300° C. A partial pressure of nitrogen is added to the CVD chamber at 25 psia (just below 2 atmospheres), the conditions are maintained for 3.25 hours, and then unreacted material is removed through alternating vacuum and nitrogen backfill cycles. The CVD chamber is next filled with 25 psia (just below 2 atmospheres) nitrogen and maintained at 300° C. for 3 hours before reducing the temperature to ambient temperature.

The resultant water contact angle of the functionalization is 121.7° and the hexadecane contact angle is 85.7°. Thermal oxidative stability of the surface at 300° C. in air after 1.5-hour exposure is high, as illustrated by water contact angle being 125.3° and hexadecane contact angle being 71.1.

EXAMPLE 5

In a fifth example, which relies upon lessened functionalization bonding time and lower amounts of (heptadecafluoro-1,1,2,2-tetrahydrodecycl) trimethoxysilane than Example 3, a fuel injection needle having a diamond-like-carbon material is functionalized by adding a first half of an amount of (heptadecafluoro-1,1,2,2-tetrahydrodecycl) trimethoxysilane to a CVD chamber at 300° C. A partial pressure of nitrogen is added to the CVD chamber at 25 psia (just below 2 atmospheres), the conditions are maintained for 5.5 hours, and then unreacted material is removed through alternating vacuum and nitrogen backfill cycles. A second half of the amount of (heptadecafluoro-1,1,2,2-tetrahydrodecycl) trimethoxysilane is added to the CVD chamber at 300° C. The CVD chamber is next filled with 25 psia (just below 2 atmospheres) nitrogen and maintained at 300° C. for 3.3 hours and then unreacted material is removed through alternating vacuum and nitrogen backfill cycles. The CVD chamber is next filled with 25 psia (just below 2 atmospheres) nitrogen and maintained at 300° C. for 5 hours before reducing the temperature to ambient temperature.

The resultant water contact angle of the functionalization is 122.9° and the hexadecane contact angle is 86.5°. Thermal oxidative stability of the surface at 300° C. in air after 3-hour exposure is very high, as illustrated by water contact angle being 121.9° and hexadecane contact angle being 76.60.

EXAMPLE 6

In a sixth example, which relies upon lessened functionalization bonding time and a different reagent, a fuel injection needle having a diamond-like-carbon material is functionalized by adding a first half of an amount of (tridecafluoro-1,1,2,2-tetrahydrooctyl) triethoxysilane to a CVD chamber at 300° C. A partial pressure of nitrogen is added to the CVD chamber at 25 psia (just below 2 atmospheres), the conditions are maintained for 3.5 hours, and then unreacted material is removed through alternating vacuum and nitrogen backfill cycles. A second half of the amount of (tridecafluoro-1,1,2,2-tetrahydrooctyl) triethoxysilane is added to the CVD chamber at 300° C. The CVD chamber is next filled with 25 psia (just below 2 atmospheres) nitrogen and maintained at 300° C. for 3.5 hours and then unreacted material is removed through alternating vacuum and nitrogen backfill cycles. The CVD chamber is next filled with 25 psia (just below 2 atmospheres) nitrogen and maintained at 300 C for 5 hours before reducing the temperature to ambient temperature.

The resultant water contact angle of the functionalization is 121.4° and the hexadecane contact angle is 79.1°. Thermal oxidative stability of the surface at 300° C. in air after 3-hour exposure is very high, as illustrated by water contact angle being 118.6° and hexadecane contact angle being 77.6°.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A chemical vapor functionalized article, comprising:
a chemical vapor functionalization on a material, the material including an $sp^3$ arrangement of carbon;
wherein the chemical vapor functionalization is positioned to be contacted by a process fluid, a hydrocarbon, an analyte, exhaust, or a combination thereof;
wherein the chemical vapor functionalization is from a single functionalizing step or wherein the chemical vapor functionalization is from a first functionalizing step, followed by a nitrogen fill at partial pressure, followed by a purge, followed by a second functionalizing step.

2. The chemical vapor functionalized article of claim 1, wherein the chemical vapor functionalized article is not a refrigerator shelf or a windshield.

3. The chemical vapor functionalized article of claim 1, wherein the chemical vapor functionalization has a contact angle for deionized water on a mirror diamond-like carbon surface that is greater than polytetrafluoroethylene by at least about 10°.

4. The chemical vapor functionalized article of claim 1, wherein the chemical vapor functionalization has a water contact angle of greater than 110°.

5. The chemical vapor functionalized article of claim 1, wherein the chemical vapor functionalization has a hexadecane contact angle of greater than 70°.

6. The chemical vapor functionalized article of claim 1, wherein the chemical vapor functionalization has a property of being capable of maintaining a water contact angle of greater than above 123° over 23.5 hours.

7. The chemical vapor functionalized article of claim 1, wherein the chemical vapor functionalization has a property of being capable of maintaining a hexadecane contact angle of greater than above 60° over 23.5 hours.

8. The chemical vapor functionalized article of claim 1, wherein the chemical vapor functionalization has an increased contact angle in comparison to the material.

9. The chemical vapor functionalized article of claim 1, wherein the chemical vapor functionalization is formed by (heptadecafluoro-1,1,2,2-tetrahydrodecycl)trimethoxysilane.

10. The chemical vapor functionalized article of claim 1, wherein the chemical vapor functionalization is formed by (tridecafluoro-1,1,2,2-tetrahydrooctyl)triethoxysilane.

11. The chemical vapor functionalized article of claim 1, wherein the chemical vapor functionalization is from the single functionalizing step.

12. The chemical vapor functionalized article of claim 1, wherein the chemical vapor functionalization is from the first functionalizing step, followed by the nitrogen fill at the partial pressure, followed by the purge, followed by the second functionalizing step.

13. The chemical vapor functionalized article of claim 12, wherein the first functionalization step and the second functionalization step are from temperature conditions within a chemical vapor of between 250° C. and 350° C.

14. The chemical vapor functionalized article of claim 1, wherein the chemical vapor functionalization is from functionalizing within a chemical vapor for over 1 hour.

15. The chemical vapor functionalized article of claim 1, wherein the chemical vapor functionalized article has a structure selected from the group consisting of a tube, a pipe, a fixture, a needle, a wafer, a column, a container, a fitting, a piston, a ring, a cylinder, a bearing, a ball, a roller bearing, a tool, a stent, or a combination thereof.

16. The chemical vapor functionalized article of claim 1, wherein the material is an intermediate layer or a coating.

17. The chemical vapor functionalized article of claim 1, wherein the material is a substrate.

18. A chemical vapor fluoro-functionalized article, comprising:
a chemical vapor fluoro-functionalization on a material,
wherein the material is a substrate selected from the group consisting of a metal substrate, a metallic substrate, a stainless steel substrate, a ceramic matrix composite substrate, a ceramic substrate, a composite metal substrate, a fiber substrate, a foil substrate, and combinations thereof; and
wherein the chemical vapor fluoro-functionalized article has a structure selected from the group consisting of a tube, a pipe, a fixture, a needle, a wafer, a column, a container, a fitting, a piston, a ring, a cylinder, a bearing, a ball, a roller bearing, a tool, a stent, or a combination thereof;
wherein the chemical vapor fluoro-functionalization is from a single functionalizing step or wherein the functionalization is from a first functionalizing step, followed by a nitrogen fill at partial pressure, followed by a purge, followed by a second functionalizing step.

19. A chemical vapor process, comprising:
chemical vapor functionalizing on a material;
wherein the chemical vapor functionalizing is on a surface positioned to be contacted by a process fluid, a hydrocarbon, an analyte, exhaust, or a combination thereof;
wherein the chemical vapor functionalization is from a single functionalizing step or wherein the chemical vapor functionalization is from a first functionalizing step, followed by a nitrogen fill at partial pressure, followed by a purge, followed by a second functionalizing step.

* * * * *